No. 651,853. Patented June 19, 1900.
W. W. HANSCOM & A. HOUGH.
MACHINE FOR MAKING ELECTRODES FOR STORAGE BATTERIES.
(Application filed Apr. 6, 1899.)
(No Model.)
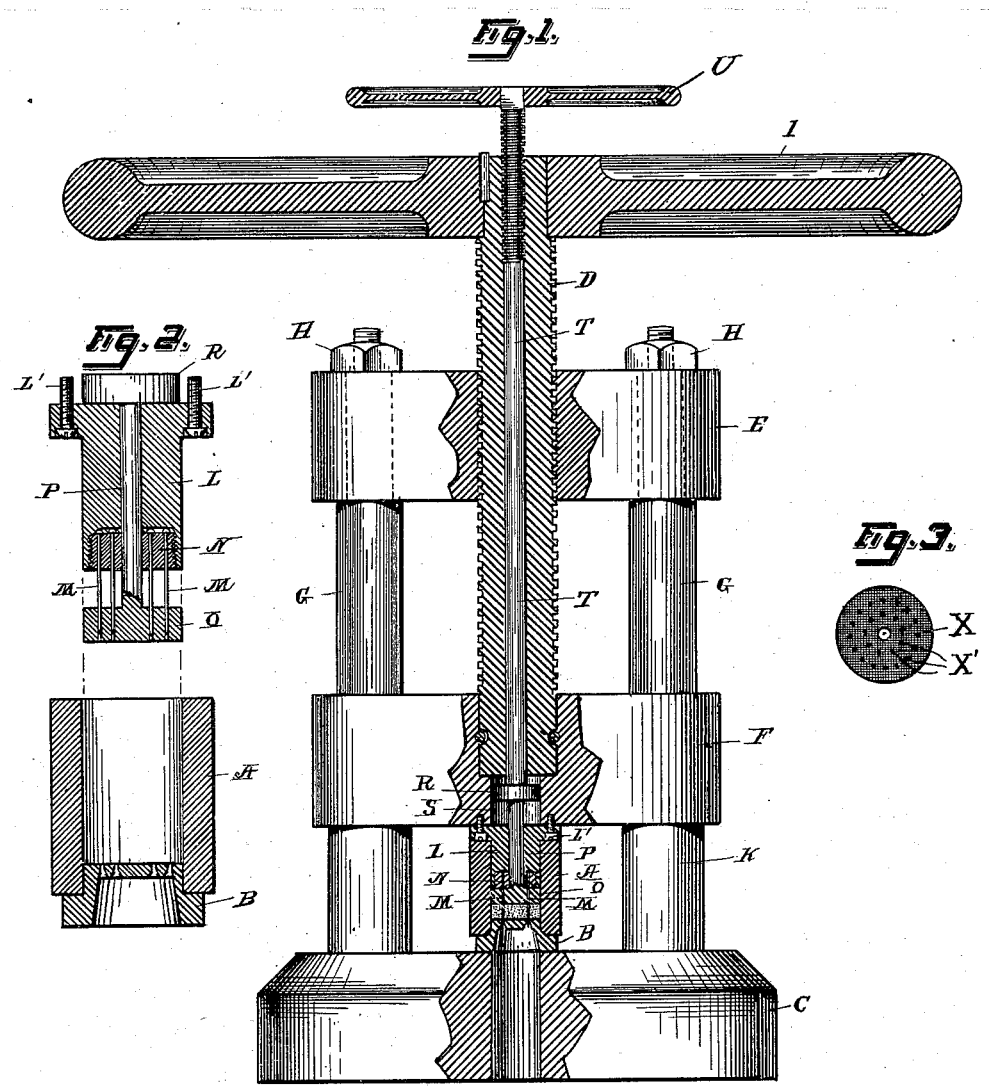

UNITED STATES PATENT OFFICE.

WILLIAM W. HANSCOM AND ARTHUR HOUGH, OF SAN FRANCISCO, CALIFORNIA, ASSIGNORS TO JAMES O'B. GUNN, OF SAME PLACE.

MACHINE FOR MAKING ELECTRODES FOR STORAGE BATTERIES.

SPECIFICATION forming part of Letters Patent No. 651,853, dated June 19, 1900.

Application filed April 6, 1899. Serial No. 711,995. (No model.)

*To all whom it may concern:*

Be it known that we, WILLIAM W. HANSCOM, a citizen of the United States, and ARTHUR HOUGH, a subject of the Queen of Great Britain, both residing at San Francisco, in the county of San Francisco and State of California, have invented certain new and useful Improvements in Machines for Making Electrodes for Storage Batteries; and we do hereby declare the following to be a full, clear, and exact description of said invention, such as will enable others skilled in the art to which it most nearly appertains to make, use, and practice the same.

This invention relates to improvements in machines for making electrodes for storage batteries, and more particularly to a machine for constructing the active material in said electrodes.

Heretofore the usual method of constructing electrodes has consisted in the employment of one of two general methods known as the "Planté" or the "Faure" methods. The latter is more commonly known as the "pasted" method, and it is the class to which the present invention more particularly relates. One general feature of this class has consisted in that the frame, grid, or support has generally been a plate of metallic lead upon which the active material has been placed. One of the methods for placing the active material on the support has consisted in providing the plate with suitable perforations and making the active material or the material to become active into the form of a paste and then placing the paste in the perforations formed in the plate.

In a companion application for patent, executed under even date herewith, we have described an approved method of constructing an electrode, and the present invention is for the machinery which we have invented to construct the pellets of active material as constructed in conformity with the method therein set forth.

In the drawings, Figure 1 is a front elevation of a machine constructed in conformity with this invention, being partly cut away to show the construction of the mold and pressing mechanism. Fig. 2 is an enlarged detail of the mold and that part of the mechanism therein termed the "plunger-head" and "stripper." Fig. 3 is a side view of a pellet as produced by this mechanism.

The product of this machine, described in the present application, consists in a partially-hard pellet in the shape of a small round disk X, as shown in the drawings, Fig. 3. This pellet is constructed from material to become active and is provided with a number of perforations X' for the purpose of permitting the electrolyte in the battery to circulate through the active material or pellet.

To facilitate the description of the drawings, we have designated the various parts by distinguishing-letters.

The mold A is a hollow cylinder opened at both ends. The lower end is closed by the bottom B, the central portion of which is raised to extend a short distance into the mold A and is provided with a series of perforations to receive the pins with which the plunger is provided to form the circulation-perforations X'. These perforations are made cone-shaped, the larger opening in the perforation being at the bottom. This construction is provided to prevent the accumulation of material in the perforations, which might choke the perforations.

In operation the mold A and the bottom B are placed together, as shown in Fig. 1. A measured quantity of dry litharge is introduced into the mold from the top. A suitable quantity of a solution of sugar and sulfate of ammonia is then poured in upon the dry powdered litharge, these being the components of the material to become active in the electrode as constructed by us. The mold A and bottom B are now placed upon the base-plate C of the press, suitable guides being provided in the base-plate C and bottom B to form an accurate adjustment for the mold upon the base-plate to secure the alinement of the perforations in the bottom B and the pins for forming the circulation-perforations in the pellet.

Mounted upon the base-plate C is the pressing mechanism. This consists of a heavy screw D, which is threaded, as shown in Fig. 1 of drawings, and extends through a stationary press-nut E, and is securely fastened at the lower end by a rotatable joint to a cross-head F. The press-nut E is mounted on suitable standards G G, to which it is secured by screw-nuts H H. The standards operate as guides for the cross-head in its rise and fall as the screw D is rotated. The screw D is rotated by means of the hand-wheel I, the diameter of which is large to give considerable leverage to the pressure. The fall of the cross-head F is regulated by stops K K, which may consist of loose collars adapted to fit over the standards G G or may be enlarged portions of the standards. At the upper end they form an abutment or shoulder, against which the cross-head F descends and forms the limit of its downward stroke.

Upon the bottom of the cross-head is securely fastened the plunger L, secured to the cross-head by means of fastening devices L'. To the lower end of the plunger L are secured the pins M M. These are secured by means of the block N, which is screwed into the lower end and forms the lower face of the plunger L. The block N is provided with suitable perforations to receive the shank of the pins M M snugly. The heads of the pins M M, when they are inserted through the block N, rest on the upper side, and when the block N is screwed into position the heads of the pins strike against and are held firmly by the bottom to the threaded perforation in the end of the plunger, into which the block N is screwed.

By means of the construction thus far described the mold A, having been properly supplied with dry litharge and the same having been moistened, is placed in position on the base-plate C. The cross-head F is raised to the upper limit of the stroke, resting near or against the press-nut E. When the bottom B is adjusted by means of the guides referred to, the perforations in the said bottom are, as stated, alined with the pins M M. The screw D being now rotated by means of the hand-wheel I, the cross-head F is carried downward, the plunger L entering the mold A. The pins M M extend through the soft material or moistened litharge and into and through the perforations in the bottom B before the plunger comes in contact with the material which is to be pressed. By this means it will be seen the pins are not deflected from their course and are therefore in position and firm before the pressure is applied to form the pellet. As the plunger L descends from this point, the material in the mold is pressed into a hardened condition, the pressure being regulated so as to produce the required pressure to render the material sufficiently firm to handle. As stated, the pressure is regulated by regulating the throw of the cross-head F. If it is desired at any time to decrease the pressure, thin washers may be applied about the standards G on top of both of the stops K K. If it is desired to increase the pressure, shorter stops may be substituted, or a plate may be placed upon the base-plate C, upon which the mold is placed. It will be noticed that by thus constructing the pellets which form the active material in the completed electrode they are formed or pressed mechanically to an equal and constant thickness, and the same quantity of litharge being always used they are formed to a constant degree of hardness or density. When the plunger L has been depressed to the limits of the stroke of the cross-head F and the pressure necessary to compress the pellet into the consistency mentioned has been reached, it becomes necessary to take the pellet out of the mold. This is accomplished by an added mechanism, which we term the "stripper" mechanism. The stripper mechanism consists in the plate O, which is perforated to pass over the pins M M. It is provided with a spindle P, which at the top is provided with a head R. The plunger L and block N are suitably perforated to permit this spindle P to pass through the same snugly. The head R, which is secured to the top of the spindle P, rests in a perforation S, in which it is guided. The head R is limited in its downward movement by the top of the plunger-block. When the bottom of the head R rests upon the top of the plunger L, the bottom of the plate O is extended past the ends of the pins M M. These parts are depressed by means of the rod T, the upper end of which is provided with a suitable screw-threaded portion which is threaded in a perforation bored centrally through the screw D. At the upper end of the threaded portion of the rod T is a small hand-wheel U, by means of which the rod is rotated. As the rod T is rotated, the head R is depressed by it to the limit of the play of the head R; but when the rod T is rotated in the reverse direction, which raises the said rod, the head R and its connected parts—the spindle P and plate O—are not raised thereby. The only office of the rod T is thus to depress these parts. With the machine provided with the stripper mechanism thus described it will be seen that the face of the plunger is the plate O, and, further, in the operation of the mechanism it will be observed that as the plunger descends the plate O is in its depressed position and strikes upon the material in the mold prior to the pins M M. The plate O and its connected parts do not, however, press upon the material, but are brought to a standstill by it, while the descending plunger extends the pins through the perforations in the plate O and through the material in the mold below the same and through the perforations provided in the bottom B. As the ends of the pins are extended into the bottom B, the face of the plunger L strikes upon the top of the plate O, and for the rest of the descent of the plunger the pressure is applied to the material in the mold, and the face of the plate O in reality forms the face of the plunger. The screw D is now reversed in its operation to lift the plunger L. The operator lifts the mold to follow the plunger until the lower edge is raised high enough to clear the pellet, when the same is pushed out below. When the mold is thus raised, it is held stationary, and the hand-wheel U is rotated to drive the screw-threaded rod T downward, which, striking on the head R and its connected parts, depresses the plate O, carrying the pellet downward until the bottom of the plate O is below the lower ends of the pins M M and the bottom edge of the mold. Being thus freed from the pins and mold, the pellets may be readily removed from the face of the plate O.

By multiplying the number of the molds A and the bottoms B and two operators being employed, the one filling the mold in the manner described and the other operating the machine as described, the operation may be conducted very rapidly.

The product of a machine built in conformity with this invention has certain advantages over the ordinary form of active material as and when contained in an electrode. This product is of an ascertained and constant density and dimension, rendering the discharge and charge of an electrode provided with this material absolutely even and constant. The pellet thus constructed with the circulation-perforations described has the advantage of permitting the entire mass of active material to become evenly and to a greater degree exposed to the action of the electrolyte.

Having thus described our invention, what we claim as new, and desire to secure by Letters Patent, is—

1. In a device of the nature indicated, a base-plate, a standard supported thereby, a cross-head movable along said standard and carrying a pressing member, and an abutment upon said standard adapted to limit the movement of the said cross-head in its pressing action; substantially as described.

2. In a device of the nature indicated, a base-plate, a standard supported thereby, a cross-head movable along said standard and carrying a pressing member, and a collar about said standard between the base-plate and the cross-head for limiting the pressing action of the latter; substantially as described.

3. In a machine for making pellets of active material for storage-battery electrodes, the combination of a suitable mold; with a plunger provided with suitable pressure mechanism and adapted to be extended into the said mold a predetermined distance; a bottom for the said mold provided with a series of perforations; a series of pins set into said plunger and alined with the perforations in the bottom; a stripper mechanism consisting in a plate perforated to extend over the said pins and to form the face of the plunger, and a suitable mechanism for extending the said plate beyond the ends of the said pins; substantially as described.

4. In a device of the nature indicated, a plunger provided with a series of pins and having a rod for operating the same, a stripper-plate over said pins, and mechanism supported by the plunger-rod for operating said stripper-plate; substantially as described.

5. In a device of the nature indicated, a plunger provided with a series of pins and having a rod for operating the same, a stripper-plate over said pins, and a rod extending through a perforation in the plunger-rod and having reciprocation therein for operating the stripper-plate; substantially as described.

6. In a device of the nature indicated, a plunger provided with a series of pins and having a rod for operating the same, a stripper-plate over said pins, a spindle upon said stripper-plate and extending through the plunger and having reciprocation therein, a head upon said spindle, and a rod extending through the plunger-rod and having reciprocation therein for operating the stripper-plate, said stripper-plate-operating rod being alined with the said spindle-head; substantially as described.

In testimony whereof we have hereunto set our hands this 15th day of March, 1899.

WILLIAM W. HANSCOM.
ARTHUR HOUGH.

Witnesses:
E. F. MURDOCK,
BALDWIN VALE.